United States Patent
Aziz et al.

(10) Patent No.: US 10,282,548 B1
(45) Date of Patent: *May 7, 2019

(54) METHOD FOR DETECTING MALWARE WITHIN NETWORK CONTENT

(71) Applicant: FireEye, Inc., Milpitas, CA (US)

(72) Inventors: Ashar Aziz, Fremont, CA (US); Stuart Staniford, Freeville, NY (US); Muhammad Amin, Fremont, CA (US); Henry Uyeno, Sunnyvale, CA (US); Samuel Yie, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/376,531

(22) Filed: Dec. 12, 2016

Related U.S. Application Data

(63) Continuation of application No. 13/405,152, filed on Feb. 24, 2012, now Pat. No. 9,519,782.

(51) Int. Cl.
  *G06F 21/00* (2013.01)
  *G06F 21/56* (2013.01)
  *H04L 29/06* (2006.01)

(52) U.S. Cl.
  CPC .......... *G06F 21/567* (2013.01); *H04L 63/145* (2013.01)

(58) Field of Classification Search
  None
  See application file for complete search history.

(56) References Cited

U.S. PATENT DOCUMENTS

| | | | |
|---|---|---|---|
| 4,292,580 A | 9/1981 | Ott et al. | |
| 5,175,732 A | 12/1992 | Hendel et al. | |
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |

(Continued)

FOREIGN PATENT DOCUMENTS

| | | |
|---|---|---|
| GB | 2439806 A | 1/2008 |
| WO | 02/006928 A2 | 1/2002 |

(Continued)

OTHER PUBLICATIONS

Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").

(Continued)

*Primary Examiner* — Piotr Poltorak
(74) *Attorney, Agent, or Firm* — Rutan Tucker, LLP

(57) ABSTRACT

Systems and methods for detecting malicious content are provided. In an exemplary embodiment, a method for detecting malicious content is described that detects when a client device has access to a remote network server of a communication network. The client device includes one or more processors. Thereafter, a controller being a device separate from the client device, activates one or more security programs within the remote network server. The security programs enable the controller to analyze data stored within or transmitted from the remote network server. Lastly, the controller analyzing the data to determine whether the data includes malware.

20 Claims, 9 Drawing Sheets

(56) References Cited

U.S. PATENT DOCUMENTS

| | | | |
|---|---|---|---|
| 6,094,677 A | 7/2000 | Capek et al. | |
| 6,269,330 B1 | 7/2001 | Cidon et al. | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | Sørhaug et al. | |
| 6,434,458 B1* | 8/2002 | Laguer-Diaz | B61L 3/125 701/31.4 |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,065,789 B1 | 6/2006 | Neyman et al. | |
| 7,069,316 B1 | 6/2006 | Gryaznov | |
| 7,080,407 B1 | 7/2006 | Zhao et al. | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,107,617 B2 | 9/2006 | Hursey et al. | |
| 7,159,149 B2 | 1/2007 | Spiegel et al. | |
| 7,203,960 B1* | 4/2007 | Painter | G06F 21/564 726/22 |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,752,317 B1* | 7/2010 | Cox | G06F 21/56 709/223 |
| 7,779,463 B2 | 8/2010 | Stolfo et al. | |
| 7,784,097 B1 | 8/2010 | Stolfo et al. | |
| 7,849,506 B1 | 12/2010 | Dansey et al. | |
| 7,869,073 B2 | 1/2011 | Oshima | |
| 7,877,786 B2* | 1/2011 | van Bemmel | H04L 63/0209 726/1 |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1* | 11/2012 | Green | H04L 63/1416 718/1 |
| 8,321,941 B2 | 11/2012 | Tuvell et al. | |
| 8,370,938 B1 | 2/2013 | Daswani et al. | |
| 8,370,939 B2 | 2/2013 | Zaitsev et al. | |
| 8,375,444 B2 | 2/2013 | Aziz et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,239 B2 | 11/2013 | Aziz et al. | |
| 8,635,696 B1 | 1/2014 | Aziz | |
| 8,832,729 B2* | 9/2014 | Nussel | H04N 21/26233 725/32 |
| 8,863,288 B1* | 10/2014 | Savage | G06F 21/567 713/188 |
| 8,881,234 B2 | 11/2014 | Narasimhan et al. | |
| 8,990,639 B1* | 3/2015 | Marr | G06F 11/30 714/25 |
| 9,519,782 B2 | 12/2016 | Aziz et al. | |
| 9,727,942 B2* | 8/2017 | Nagai | G06T 1/20 |
| 2001/0005889 A1 | 6/2001 | Albrecht | |
| 2001/0047326 A1 | 11/2001 | Broadbent et al. | |
| 2002/0018903 A1 | 2/2002 | Kokubo et al. | |
| 2002/0038430 A1 | 3/2002 | Edwards et al. | |
| 2002/0091819 A1* | 7/2002 | Melchione | H04L 12/24 709/224 |
| 2002/0095607 A1 | 7/2002 | Lin-Hendel | |
| 2002/0116627 A1 | 8/2002 | Tarbotton et al. | |
| 2002/0144156 A1 | 10/2002 | Copeland | |
| 2002/0162015 A1 | 10/2002 | Tang | |
| 2002/0166063 A1 | 11/2002 | Lachman et al. | |
| 2002/0184528 A1 | 12/2002 | Shevenell et al. | |
| 2002/0188887 A1 | 12/2002 | Largman et al. | |
| 2002/0194490 A1 | 12/2002 | Halperin et al. | |
| 2003/0074578 A1 | 4/2003 | Ford et al. | |
| 2003/0084318 A1 | 5/2003 | Schertz | |
| 2003/0101381 A1 | 5/2003 | Mateev et al. | |
| 2003/0110258 A1* | 6/2003 | Wolff | H04L 63/145 709/225 |
| 2003/0115483 A1 | 6/2003 | Liang | |
| 2003/0188190 A1 | 10/2003 | Aaron et al. | |
| 2003/0191957 A1 | 10/2003 | Hypponen et al. | |
| 2003/0200460 A1 | 10/2003 | Morota et al. | |
| 2003/0212902 A1 | 11/2003 | van der Made | |
| 2003/0237000 A1 | 12/2003 | Denton et al. | |
| 2004/0003323 A1 | 1/2004 | Bennett et al. | |
| 2004/0015712 A1 | 1/2004 | Szor | |
| 2004/0019832 A1 | 1/2004 | Arnold et al. | |
| 2004/0047356 A1 | 3/2004 | Bauer | |
| 2004/0083408 A1 | 4/2004 | Spiegel et al. | |
| 2004/0111531 A1 | 6/2004 | Staniford et al. | |
| 2004/0165588 A1 | 8/2004 | Pandya | |
| 2004/0236963 A1 | 11/2004 | Danford et al. | |
| 2004/0243349 A1 | 12/2004 | Greifeneder et al. | |

(56) References Cited

U.S. PATENT DOCUMENTS

| | | |
|---|---|---|
| 2004/0243829 A1 | 12/2004 | Jordan |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0114663 A1 | 5/2005 | Cornell et al. |
| 2005/0125195 A1 | 6/2005 | Brendel |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0098652 A1* | 5/2006 | Singh ............... H04L 45/00 370/389 |
| 2006/0101516 A1 | 5/2006 | Sudaharan et al. |
| 2006/0101517 A1 | 5/2006 | Banzhaf et al. |
| 2006/0117385 A1 | 6/2006 | Mester et al. |
| 2006/0123477 A1 | 6/2006 | Raghavan et al. |
| 2006/0143316 A1 | 6/2006 | Mills et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0174344 A1* | 8/2006 | Costea ............... G06F 21/564 726/24 |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236392 A1* | 10/2006 | Thomas ............... G06F 21/562 726/23 |
| 2006/0236393 A1 | 10/2006 | Kramer et al. |
| 2006/0242709 A1 | 10/2006 | Seinfeld et al. |
| 2006/0248582 A1 | 11/2006 | Panjwani et al. |
| 2006/0251104 A1 | 11/2006 | Koga |
| 2006/0282896 A1 | 12/2006 | Qi |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157306 A1 | 7/2007 | Elrod et al. |
| 2007/0169184 A1* | 7/2007 | Krywaniuk ......... H04L 63/0245 726/11 |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0072326 A1 | 3/2008 | Danford et al. |
| 2008/0080518 A1 | 4/2008 | Hoeflin et al. |
| 2008/0098476 A1 | 4/2008 | Syversen |
| 2008/0120722 A1 | 5/2008 | Sima et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0320594 A1 | 12/2008 | Jiang |
| 2009/0007100 A1 | 1/2009 | Field et al. |
| 2009/0013408 A1 | 1/2009 | Schipka |
| 2009/0031423 A1 | 1/2009 | Liu et al. |
| 2009/0044024 A1* | 2/2009 | Oberheide ............ G06F 21/562 713/188 |
| 2009/0044274 A1 | 2/2009 | Budko et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0133125 A1 | 5/2009 | Choi et al. |
| 2009/0193293 A1 | 7/2009 | Stolfo et al. |
| 2009/0228233 A1 | 9/2009 | Anderson et al. |
| 2009/0241190 A1 | 9/2009 | Todd et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0293268 A1 | 11/2010 | Jones et al. |
| 2011/0025504 A1 | 2/2011 | Lyon et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0247072 A1 | 10/2011 | Staniford et al. |
| 2011/0265182 A1 | 10/2011 | Peinado et al. |
| 2011/0307955 A1 | 12/2011 | Kaplan et al. |
| 2011/0314546 A1 | 12/2011 | Aziz et al. |
| 2012/0036580 A1* | 2/2012 | Gorny ............... H04L 63/1433 726/25 |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0174227 A1 | 7/2012 | Mashevsky et al. |
| 2012/0210423 A1 | 8/2012 | Friedrichs et al. |
| 2012/0222121 A1 | 8/2012 | Staniford et al. |
| 2012/0330801 A1 | 12/2012 | McDougal et al. |
| 2013/0036472 A1 | 2/2013 | Aziz |

(56) References Cited

U.S. PATENT DOCUMENTS

2013/0227691 A1   8/2013   Aziz et al.
2013/0291109 A1   10/2013  Staniford et al.

FOREIGN PATENT DOCUMENTS

WO   02/23805 A2      3/2002
WO   2008/041950 A2   4/2008
WO   2012/145066 A1   10/2012

OTHER PUBLICATIONS

Silicon Defense, "Worm Containment in the Internal Network", (Mar. 2003), pp. 1-25.
Singh, S., et al., "Automated Worm Fingerprinting", Proceedings of the ACM/USENIX Symposium on Operating System Design and Implementation, San Francisco, California, (Dec. 2004).
Spitzner, Lance, "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham, "Insertion, Evasion, and Denial of Service: Eluding Network Intrusion Detection", Secure Networks, ("Ptacek"), (Jan. 1998).
U.S. Appl. No. 13/405,152, filed Feb. 24, 2012 Final Office Action dated Jul. 21, 2015.
U.S. Appl. No. 13/405,152, filed Feb. 24, 2012 Final Office Action dated Mar. 4, 2014.
U.S. Appl. No. 13/405,152, filed Feb. 24, 2012 Non-Final Office Action dated Dec. 17, 2014.
U.S. Appl. No. 13/405,152, filed Feb. 24, 2012 Non-Final Office Action dated Jan. 15, 2016.
U.S. Appl. No. 13/405,152, filed Feb. 24, 2012 Non-Final Office Action dated Jun. 28, 2013.
U.S. Appl. No. 13/405,152, filed Feb. 24, 2012 Notice of Allowance dated Jul. 29, 2016.
Venezia, Paul, "NetDetector Captures Intrusions", InfoWorld Issue 27, ("Venezia"), (Jul. 14, 2003).
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
"Network Security: NetDetector—Network Intrusion Forensic System (NIFS) Whitepaper", ("NetDetector Whitepaper"), (2003).
"Packet", Microsoft Computer Dictionary, Microsoft Press, (Mar. 2002), 1 page.
"When Virtual is Better Than Real", IEEEXplore Digital Library, available at, http://ieeexplore.ieee.org/xpl/articleDetails.isp?reload=true&arnumbe- r=990073, (Dec. 7, 2013).
Adetoye, Adedayo, et al., "Network Intrusion Detection & Response System", ("Adetoye"), (Sep. 2003).
AltaVista Advanced Search Results. "attack vector identifier". Http://www.altavista.com/web/results? Itag=ody&pg=aq&aqmode=aqa=Event+Orch- estrator . . . , (Accessed on Sep. 15, 2009).
AltaVista Advanced Search Results. "Event Orchestrator". Http://www.altavista.com/web/results?Itag=ody&pg=aq&aqmode=aqa=Event+Orch- esrator . . . , (Accessed on Sep. 3, 2009).
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco, Configuring the Catalyst Switched Port Analyzer (SPAN) ("Cisco"), (1992).
Cohen, M.I., "PyFlag—An advanced network forensic framework", Digital investigation 5, Elsevier, (2008), pp. S112-S120.
Costa, M., et al., "Vigilante: End-to-End Containment of Internet Worms", SOSP '05, Association for Computing Machinery, Inc., Brighton U.K., (Oct. 23-26, 2005).
Crandall, J.R., et al., "Minos:Control Data Attack Prevention Orthogonal to Memory Model", 37th International Symposium on Microarchitecture, Portland, Oregon, (Dec. 2004).
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Hjelmvik, Erik, "Passive Network Security Analysis with NetworkMiner", (IN)Secure, Issue 18, (Oct. 2008), pp. 1-100.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
International Search Report and Written Opinion of the International Searching Authority dated May 10, 2012; International Application No. PCT/US 12/21916.
International Search Report and Written Opinion of the International Searching Authority dated May 25, 2012; International Application No. PCT/US 12/26402.
Kaeo, Merike, "Designing Network Security", ("Kaeo"), (Nov. 2003).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King") (2003).
Krasnyansky, Max, et al., Universal TUN/TAP driver, available at https://www.kernel.org/doc/Documentation/networking/tuntap.txt (2002) ("Krasnyansky").
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Liljenstam, Michael, et al., "Simulating Realistic Network Traffic for Worm Warning System Design and Testing", Institute for Security Technology studies, Dartmouth College ("Liljenstam"), (Oct. 27, 2003).
Marchette, David J., "Computer Intrusion Detection and Network Monitoring: A Statistical Viewpoint", ("Marchette"), (2001).
Margolis, P.E., "Random House Webster's 'Computer & Internet Dictionary 3rd Edition'", ISBN 0375703519, (Dec. 1998).
Moore, D., et al., "Internet Quarantine: Requirements for Containing Self-Propagating Code", INFOCOM, vol. 3, (Mar. 30-Apr. 3, 2003), pp. 1901-1910.
Natvig, Kurt, "SANDBOXII: Internet", Virus Bulletin Conference, ("Natvig"), (Sep. 2002).
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J., et al., "Polygraph: Automatically Generating Signatures for Polymorphic Worms", In Proceedings of the IEEE Symposium on Security and Privacy, (May 2005).
Nojiri, D., et al., "Cooperation Response Strategies for Large Scale Attack Mitigation", DARPA Information Survivability Conference and Exposition, vol. 1, (Apr. 22-24, 2003), pp. 293-302.

(56) References Cited

OTHER PUBLICATIONS

Office Actions dated Apr. 13, 2010, Oct. 28, 2010, and Jan. 31, 2012, in U.S. Appl. No. 11/709,570, filed Feb. 21, 2007.

Office Actions dated Apr. 18, 2011, Aug. 26, 2011, and Apr. 11, 2012, and Advisory Action dated Nov. 9, 2011, in U.S. Appl. No. 12/263,971, filed Nov. 3, 2008.

Office Actions dated Apr. 2, 2009, Nov. 25, 2009, Oct. 5, 2010, and Aug. 29, 2011, in U.S. Appl. No. 11/151,812, filed Jun. 13, 2005.

Office Actions dated Apr. 2, 2009, Oct. 28, 2009, and Aug. 31, 2010, and Notices of Allowance dated Feb. 23, 2011 and Jun. 8, 2011, in U.S. Appl. No. 11/152,286, filed Jun. 13, 2005.

Office Actions dated Apr. 20, 2010, Sep. 28, 2010, and Dec. 20, 2011, in U.S. Appl. No. 11/717,408, filed Mar. 12, 2007.

Office Actions dated Aug. 8, 2008, Feb. 11, 2009, Aug. 4, 2009, Mar. 29, 2010, Nov. 24, 2010, May 10, 2011, and Aug. 23, 2011, Advisory Action dated Jul. 26, 2011, and Notices of Allowance dated Dec. 15, 2011 and Feb. 7, 2012, in U.S. Appl. No. 11/409,355, filed Apr. 20, 2006.

Office Actions dated Feb. 2, 2010, Jul. 14, 2010, Nov. 10, 2010, and Jun. 9, 2011, and Notice of Allowance dated Mar. 23, 2012, in U.S. Appl. No. 11/998,750, filed Nov. 30, 2007.

Office Actions dated Jul. 20, 2009, May 11, 2010, Dec. 21, 2010, and Aug. 19, 2011, in U.S. Appl. No. 11/471,072, filed Jun. 19, 2006.

Office Actions dated Jun. 17, 2010 and Feb. 2, 2011, in U.S. Appl. No. 11/717,476, filed Mar. 12, 2007.

Office Actions dated May 25, 2010 and Feb. 2, 2011, in U.S. Appl. No. 11/717,474, filed Mar. 12, 2007.

Office Actions dated May 27, 2011, Dec. 5, 2011, and Mar. 16, 2012, in U.S. Appl. No. 11/998,605, filed Nov. 30, 2007.

Office Actions dated May 6, 2010 and Nov. 22, 2010, in U.S. Appl. No. 11/717,475, filed Mar. 12, 2007.

Office Actions dated Oct. 13, 2009 and Apr. 23, 2010, in U.S. Appl. No. 11/494,990, filed Jul. 28, 2006.

Office Actions dated Sep. 5, 2008, Feb. 12, 2009, Oct. 26, 2009, Sep. 29, 2010, and Mar. 16, 2011, in U.S. Appl. No. 11/096,287, filed Mar. 31, 2005.

\* cited by examiner

METHOD FOR DETECTING MALWARE WITHIN NETWORK CONTENT

CROSS-REFERENCE TO RELATED APPLICATIONS

This application is a continuation of U.S. patent application Ser. No. 13/405,152 filed Feb. 24, 2012, now U.S. Pat. No. 9,519,782, the entire contents of which are incorporated by reference.

This application is related to U.S. patent application Ser. No. 13/011,344 entitled "Systems and Methods for Detecting Malicious PDF Network Content" which is a continuation-in-part of U.S. patent application Ser. No. 12/263,971 entitled "Systems and Methods for Detecting Malicious Network Content" and filed on Nov. 3, 2008. This application is also related to U.S. patent application Ser. No. 11/409,355 entitled "Heuristic Based Capture with Replay to Virtual Machine" and filed on Apr. 20, 2006, which is a continuation-in-part of U.S. patent application Ser. No. 11/152,286 entitled "Computer Worm Defense System and Method" and filed on Jun. 13, 2005, which claims the priority benefit of U.S. Provisional Patent Application Ser. No. 60/579,910 entitled "Computer Worm Defense System and Method" and filed on Jun. 14, 2004. U.S. patent application Ser. No. 11/409,355 is also a continuation-in-part of U.S. patent application Ser. No. 11/096,287 entitled "System and Method of Detecting Computer Worms" and filed on Mar. 31, 2005, which claims the priority benefit of U.S. Provisional Patent Application Ser. No. 60/559,198 entitled "System and Method of Detecting Computer Worms" and filed on Apr. 1, 2004. U.S. patent application Ser. No. 11/409,355 is also a continuation-in-part of U.S. patent application Ser. No. 11/151,812 entitled "System and Method of Containing Computer Worms" and filed on Jun. 13, 2005, which claims the priority benefit of U.S. Provisional Patent Application No. 60/579,953 entitled "System and Method of Containing Computer Worms" and filed on Jun. 14, 2004. Each of the aforementioned patent applications is incorporated by reference herein.

BACKGROUND

Field

The present disclosure relates generally to data processing. More particularly, the present disclosure relates to the detecting malicious network content on portable data storage devices and remote network servers.

Related Art

Governments, the military, corporations, financial institutions, hospitals, and private businesses amass a great amount of confidential information about their employees, customers, products, research, and their financial status. Furthermore, government information systems may include classified information related to national security, command and control of military forces, or fulfillment of intelligence missions. Protecting confidential information from theft and corruption while allowing the information to remain accessible and productive to its intended users has been one of the major goals of computer security. However, as computer security becomes savvier to malicious attacks via e-mail and other avenues, cybercriminals are turning to portable data storage devices for malware distribution. Portable data storage devices, such as Universal Serial Bus (USB) flash drives, are small, readily available, and inexpensive, thereby making them popular for storing and transporting files from one computer to another. However, these same characteristics make them appealing to attackers.

According to some research, a quarter of all of malware today is developed to be disseminated through USB devices. One reason for the popularity of USB devices is the simplicity with which malware can be distributed. Most hackers do not wish to spend hours and hours trying to hack secured computers. Spreading malware through USB devices is a simple way to distribute malware with just a few clicks. An attacker might infect a computer with malware that can detect when a USB drive is plugged into a computer. The malware may then download malicious code onto the drive. When the USB drive is plugged into another computer, the malware infects that computer.

There are solutions on the market for addressing the threat with varying degree of success. Some of these solutions aim at preventing USB drives from being recognized by computers. Other solutions require disabling AutoRun functionality or maintaining a dedicated computer for USB related activities. Some even advocate moving away from USB drives to cloud-based solutions. Most of these solutions require limiting accessibility of the information contained on the USB drives instead of addressing the threat directly.

The network file sharing technology is another solution for data transmission between computers. Lately, this technology has become a popular tool for sharing data over the Internet and/or local area networks. However, malware is often spread through remote network servers, making file sharing services one of the most frequent ways of virus infections and computer failures. Remote network servers may contain malware software which can be downloaded while downloading other files requested by users. Current anti-virus technology may be inefficient in detecting these malicious files as they may not become active until after the download is complete or until the requested files are run. Thus, it is desirable to detect malware on the remote network servers before any files are downloaded.

SUMMARY

Exemplary embodiments provide for detecting malicious network content on portable data storage devices. In a first exemplary embodiment, a method is disclosed for detecting malicious network content on portable data storage devices upon insertion of the devices into a security appliance. The method may comprise detecting the insertion of portable data storage devices in a security appliance, receiving, via a communication network, data associated with the portable data storage devices, analyzing the data to determine whether the data storage devices include malware, and selectively identifying the malware stored on the one or more portable data storage devices.

In a second exemplary embodiment, a method is disclosed for detecting malicious network content on a portable data storage device when the device is connected to a host device. The method may comprise detecting a portable data storage device upon connection to a computer, accessing device data, analyzing the device data to determine whether the portable storage device includes malware, and selectively identifying the portable storage device as having the malware.

In a third exemplary embodiment, a method is disclosed for detecting malicious network content within remote network servers. The method may comprise detecting connecting of a client device to a remote network server, receiving data stored on the remote network server, analyzing the data of the remote network server to determine whether the data includes malware, and based on the determination, selectively identifying the remote network server as storing the malware.

In further embodiments, modules, subsystems, or devices can be adapted to perform the recited methods. Furthermore, in various embodiments, a non-transitory machine readable medium may have executable code embodied thereon, with the executable code being executable by a processor for performing above methods.

DESCRIPTION OF EXEMPLARY EMBODIMENTS

Figure 1:
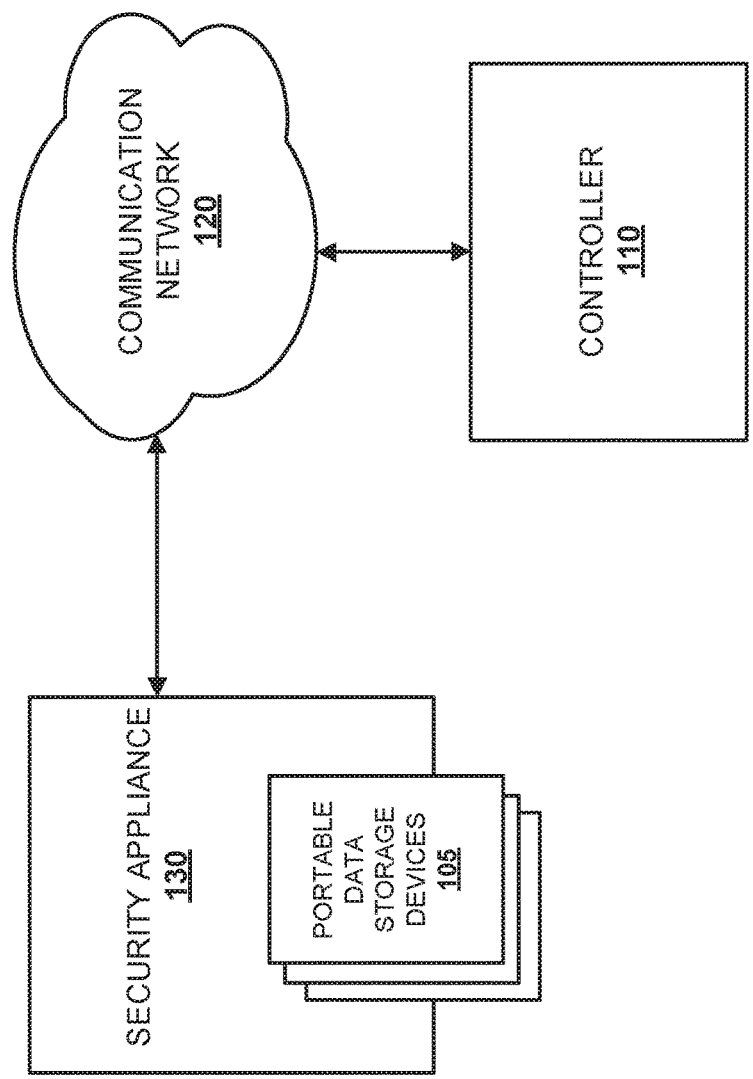
FIG. 1 is a diagram of an exemplary environment in which various embodiments for detecting malicious network content on portable data storage devices upon insertion of the devices into a security appliance may be practiced.

Exemplary systems and methods for detecting malicious network content (e.g., malicious software or malware) on portable data storage devices are provided. In some exemplary embodiments, the systems and methods may allow for protecting organizations from malware infections. The systems and methods may be embodied in three exemplary modes.

The first mode allows screening portable storage devices, such as USB flash drives or memory cards, upon inserting the devices into a security appliance. The security appliance may be associated with a security screening location such as a security checkpoint in a building. The security appliance may include a number of slots configured to receive a plurality of portable data storage devices simultaneously. Security personal may direct owners of the portable data storage devices to insert the portable storage devices into the security appliance. The security appliance may detect insertion of the portable data storage devices and send, via a communication network, the data stored on the portable storage devices to a remotely located controller for analysis.

Upon insertion of a portable data storage device into the security appliance, the security appliance may provide the owner of the portable data storage device with an estimated time to complete the analysis, with the estimate being based on the current latency due to the analysis.

The controller may analyze the data and determine whether the portable data storage devices store malware. The controller may commence the procedure by analyzing the data with predetermined heuristics to determine whether the data includes certain suspicious traits. The latency due to the analysis process may be too high for the data to be analyzed with normal heuristics without exceeding the maximum time allotted for the analysis. Therefore, a faster heuristics analysis may be utilized. Since the faster heuristics analysis may not be as comprehensive, a copy of the data may be saved for later analysis. For example, at a security checkpoint, a determination may need to be made within a reasonable time to allow the queue to move quickly through a metal detector. Therefore, the controller should be able to analyze the files on a portable data storage device and send the result of the analysis rapidly. Depending on the latency of the communication network, the controller may need to decide which heuristics to use. If the heuristics analysis indicates a suspicious activity, the controller may configure a virtual machine to safely receive and execute the suspected data in a simulated real-life environment. The response of the virtual machine to the deployment of the suspected data may be analyzed to determine whether the data contains malware. If the controller determines that one or more portable security devices store malware, the security appliance may provide a warning signal. For example, a pattern of beeps and/or flashes may indicate a security threat. If, on the other hand, there is no current indication of malware, the portable data storage device may receive provisional clearance. However, if a later analysis with normal heuristics indicates a problem, the owner of the portable data storage device may be located by the security personal and appropriate measures may be taken. For example, the portable data storage device may be confiscated.

The second mode may allow detecting malicious content on a portable data storage device upon insertion of the device into a host device, such as a personal computer (PC). The techniques utilized to determine whether the portable data storage device contains malware are similar to the ones described above. The method may include detecting the portable data storage device upon connection to the host device and analyzing the data stored on the portable data storage device to determine whether the data includes malware.

The method may commence with the controller responsible for the data analysis quarantining the data within the host device. For example, the controller may prevent executing any files stored on the portable data storage device.

The third mode may allow detecting malicious content on a remote network server before files are downloaded over a network such as the Internet. Thus, files may be analyzed before the downloading to a client device may proceed, i.e. in an active rather than passive manner. The technique allowing determining whether the remote network server contains malware similarly to the ones described above. The techniques may include detecting that a client device accesses the remote network server when connection over a network is established and analyzing the data stored on the remote network server to determine whether or not the data includes malware. The technique may further include actively monitoring the remote network server for the presence of new files, actively downloading those new files, analyzing the files to determine if they are suspicious and running the files in a virtual machine environment to identify malware.

The client device such as a personal computer may embed a controller or the controller can be remotely located and accessible over the network. The controller may analyze the data stored on the remote network server with predetermined heuristics to determine whether the data includes certain suspicious traits. The controller may limit data to be analyzed to the data intended for downloading by the client device. If the heuristics analysis indicates a suspicious activity, the controller may configure a virtual machine to safely receive and execute the suspected data in a simulated real-life environment. The response of the virtual machine to the deployment of the suspected data may be analyzed to determine whether the data contains malware. If the controller determines that the remote networking server stores malware, the controller may provide a warning signal.

Malware is software created and distributed for malicious purposes and can take the form of viruses, worms, Trojan horses or adware, for example. A virus is an intrusive program that infects a computer file by inserting a copy of itself in the file. The copy is usually executed when the file is loaded into memory, allowing the virus to infect other files. A worm is a program that propagates itself across multiple computers, usually by creating copies of itself in each computer's memory. A worm might duplicate itself in a computer so many times that it causes the computer to crash. A Trojan horse is a destructive program disguised as a game, utility, or application. When run by a user or computer program, a Trojan horse can harm the computer system while appearing to do something useful.

Malware may also include adware and spyware. Adware is a program configured to direct advertisements to a computer or a particular user. In one example, adware identifies the computer and/or the user to various websites visited by a browser on the computer. The website may then use the adware to either generate pop-up advertisements or otherwise direct specific advertisements to the user's browser. Spyware is a program configured to collect information regarding the user, the computer, and/or a user's network habits. In an example, spyware may collect information regarding the names and types of websites that the user browses and then transmit the information to another computer. Adware and spyware are often added to the user's computer after the user browses a website that hosts the adware and/or spyware. The user is often unaware that these programs have been added and is similarly unaware of the adware and/or spyware's function.

Referring now to the drawings, FIG. 1 is a diagram of an exemplary environment 100 in which various embodiments for detecting malicious network content on portable data storage devices by inserting the devices into a security appliance may be practiced. The environment 100 may include portable data storage devices 105 inserted into a security appliance 130. The security appliance 130 may be communicatively coupled to a communication network 120. A controller 110 may also be communicatively coupled to the communication network 120.

The portable data storage devices 105 are any combination of one or more storage devices designed to hold any kind of digital data. For example, a USB flash drive is a portable data storage device including a flash memory data storage device integrated with a USB interface. In yet another example, the portable data storage device may refer to a memory card.

The security appliance 130 is a digital device which may include a plurality of interfaces to simultaneously receive one or more of the portable data storage devices 105. Upon insertion of the portable data storage devices 105 into the security appliance 130, the data stored on the portable data storage devices 105 may be transmitted to the controller 110 via the communication network 120. The security appliance 130 may include dedicated circuitry and comprise one or more processors. The security appliance 130 may include any combination of computers and servers. The data stored on the portable data storage devices 105 may include any kind of digital data. Although FIG. 1 depicts the security appliance as coupled to the controller 110 via the communication network 120, the security appliance 130 may be directly coupled to the controller 110.

The controller 110 may be a digital device or software configured to receive and analyze data for the presence of malware. In exemplary embodiments, the controller 110 may detect the presence of the portable data storage devices 105 when the portable data storage devices 105 are initially inserted into the security appliance 130. The controller 110 may intercept data transmitted from the portable data storage devices 105 for a predetermined period of time. In other embodiments, the security appliance 130 may direct the data transmitted from the portable data storage devices 105 to the controller 110 for a predetermined period of time.

The controller 110 may also be configured to transmit a command to the security appliance 130 to activate one or more security programs. The one or more security programs can be resident within the security appliance 130 and are configured to operate security functions. In some embodiments, the controller 110 can scan and activate security programs on the portable data storage devices 105 without the necessity of installing any agents on the security appliance 130. As such, multiple security programs on the portable data storage devices 105 may be activated upon insertion in the security appliance. By performing security functions upon connection, the portable data storage devices 105 may be analyzed for the presence of malware. Security functions are further described in FIG. 4. The data may then be analyzed by the controller 110 to determine evidence of malware. If malware is detected, the controller 110 may report the threat. The controller 110 is further discussed in FIG. 4.

The communication network 120 couples two or more digital devices together to allow the digital devices to communicate and transmit data to each other. In some exemplary embodiments, the communication network 120 may be a public computer network such as the Internet, or a private computer network such as a wireless telecommunication network, wide area network (WAN), or local area network (LAN). In some embodiments, the communication network 120 comprises multiple routers, bridges, and hubs that couple a large number of digital devices.

Figure 2:
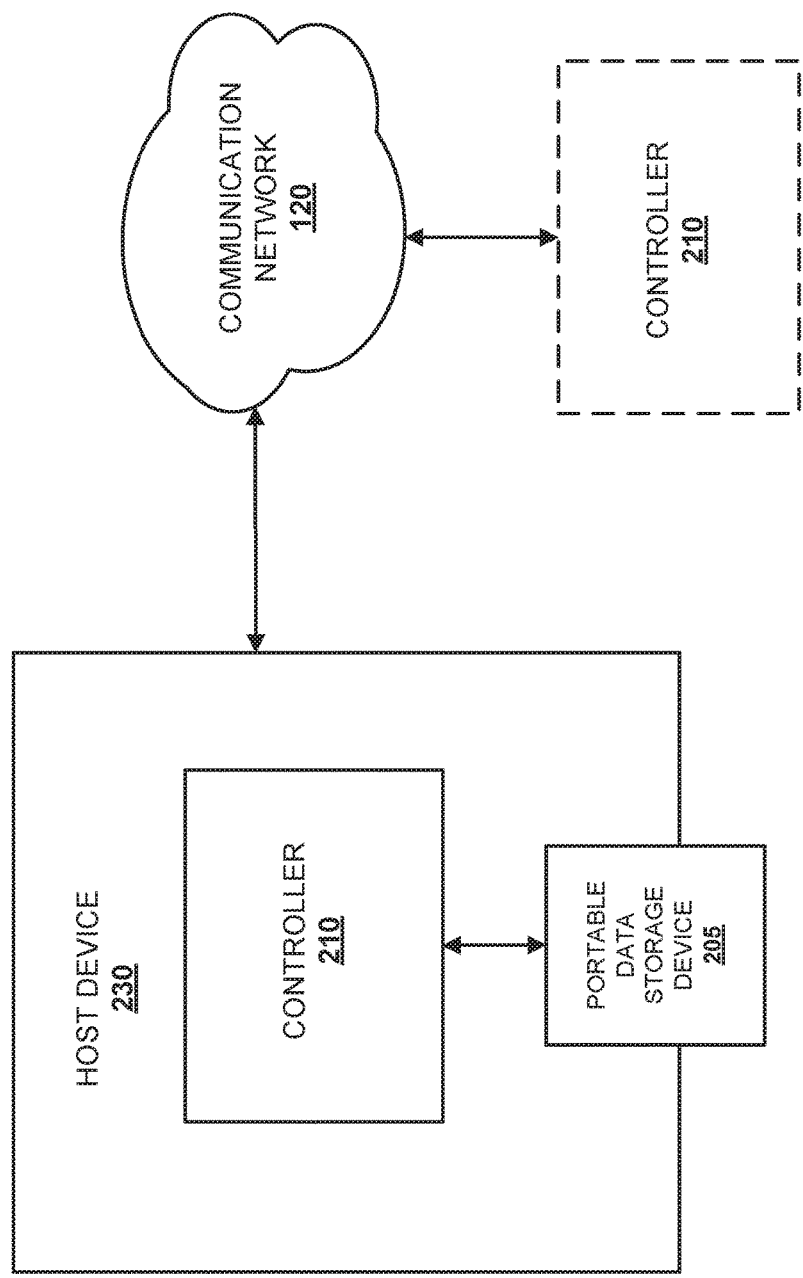
FIG. 2 is a diagram of an exemplary environment in which various embodiments for detecting malicious network content on portable data storage devices upon connection of the device to a host device may be practiced.

FIG. 2 is a diagram of an exemplary environment 200 in which various embodiments for detecting malicious network content on portable data storage devices when the devices are connected to a host device may be practiced.

The environment 200 includes a host device 230 and a portable data storage device 205. The portable data storage device 205 may be connected to the host device 230 via a storage device interface (not shown). In some embodiments, a controller 210 may be run within the host device 230. In other embodiments, the host device 230 may be located remotely and coupled to the controller 210 via the communication network 120. The portable data storage device 205 may be a storage device designed to hold any kind of digital data. The host device 230 may be any device comprising one or more processors. Some examples of host device 230 include computers, servers, laptops, tablet computers, personal digital assistants (PDAs), cellular telephones, and smart phones.

The portable data storage device 205 may include any kind of digital data. Although FIG. 2 depicts the controller 210 as optionally coupled to the communication network 120, the controller 210 may be directly coupled to the host device 230. The controller 210 may be a digital device or software configured to receive and analyze data for the presence of malware. In exemplary embodiments, the controller 210 may detect the presence of portable data storage device 205 when the portable data storage device 205 initially couples to host device 230. The controller 210 may intercept data transmitted from the portable data storage device 205 or the host device 230 for a predetermined period of time. In other embodiments, the host device 230 is configured to direct the data transmitted from the portable data storage device 205 to the controller 210 for a predetermined period of time.

The controller 210 may also be configured to transmit a command to the host device 230 to activate one or more security programs. In some exemplary embodiments, the one or more security programs can be resident within the portable data storage device 205 and are configured to operate security functions. The controller 210 can scan and activate security programs on the portable data storage device 205 without the necessity of installing an agent on the host device 230. By performing security functions upon connection, the controller may analyze the contents of the portable data storage device for malware. Security functions are further described in FIG. 4. The data is then analyzed by the controller 210 to determine evidence of malware. If malware is detected, the controller 210 may provide an indication to that effect. The controller 210 is further discussed in FIG. 4.

Figure 3:
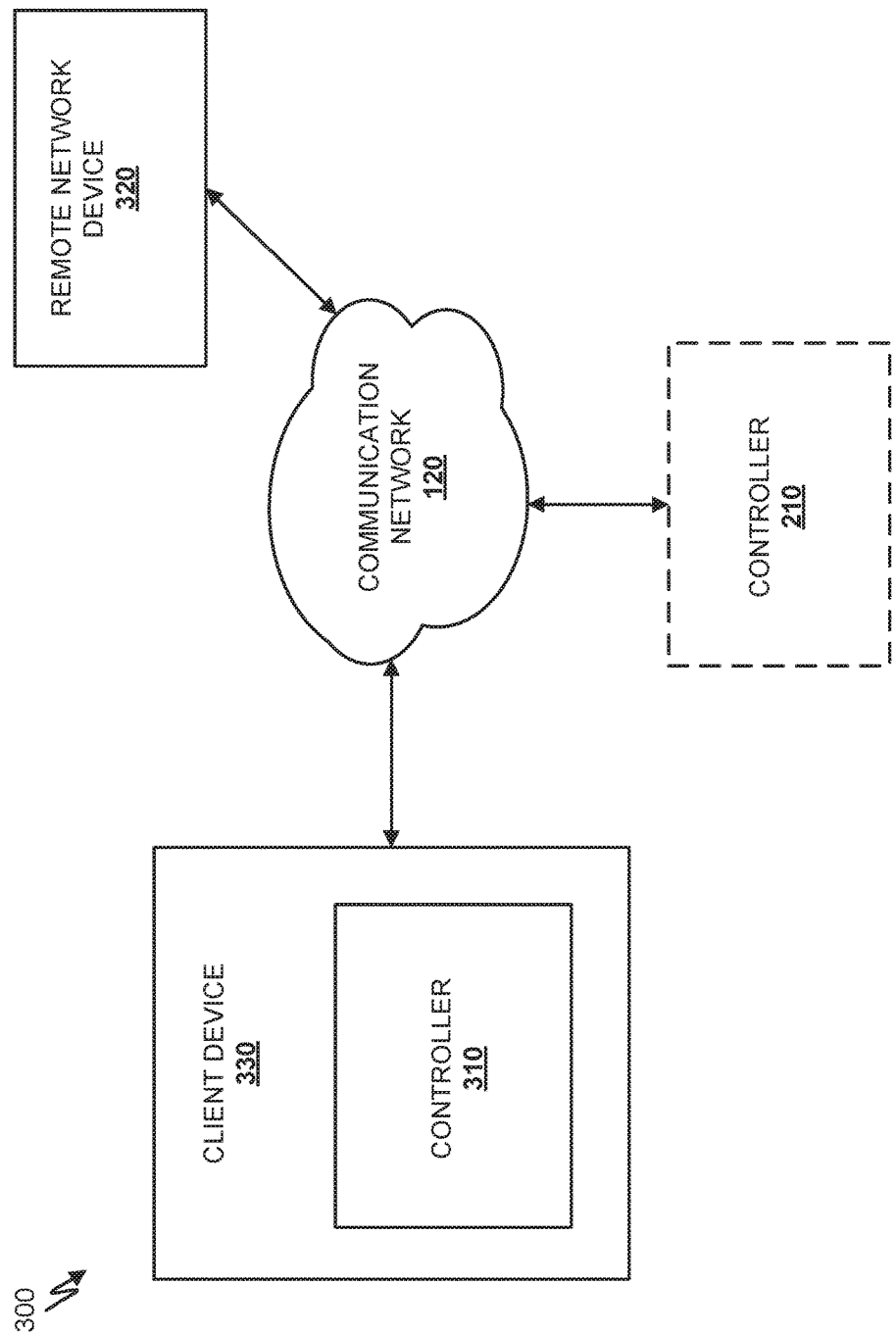
FIG. 3 is a diagram of an exemplary environment in which various embodiments for detecting malicious network content on remote network servers when the servers are connected to client devices may be practiced.

FIG. 3 is a diagram of an exemplary environment 300 in which various embodiments for detecting malicious network content on remote network servers when the servers are connected to client devices may be practiced.

The environment 300 may comprise a controller 310, a remote networking server 320, a client device 330, and the communication network 120 which operatively couples all mentioned modules.

In some embodiments, the controller 310 may be embedded within the client device 330. In other embodiments, the controller 310 may be located remotely and coupled to the client device 330 via the communication network 120. The client device 330 may be any device comprising one or more processors. Some examples of client device 330 include computers, servers, laptops, tablet computers, personal digital assistants (PDAs), cellular telephones, and smart phones.

The controller 310 may be a digital device, software or a combination thereof configured to receive and analyze data for the presence of malware. In exemplary embodiments, the controller 310 may detect intent by the client device 330 to download data from the remote networking server 320 over the communication network 120. The controller 310 may intercept data transmitted from the remote networking server 320 for a predetermined period of time. In other embodiments, the client device 310 may be configured to direct the data transmitted from the remote networking server 320 to the remotely located controller 310 for a predetermined period of time.

The controller 310 may also be configured to transmit a command to the client device 330 to activate one or more security programs. In some exemplary embodiments, the one or more security programs can be resident within the remote network server 320 and are configured to operate security functions. The controller 310 may scan and activate security programs on the remote network server 320 without installing an agent on the client device 330. By performing security functions upon connection, the controller 310 may analyze the content to be downloaded by the client device 330 for malware. The security functions are further described in FIG. 4. The data may be analyzed by the controller 310 for evidence of malware. If malware is detected, the controller 310 may provide an indication to that effect. The controller 310 is further discussed in FIG. 4.

Figure 4:
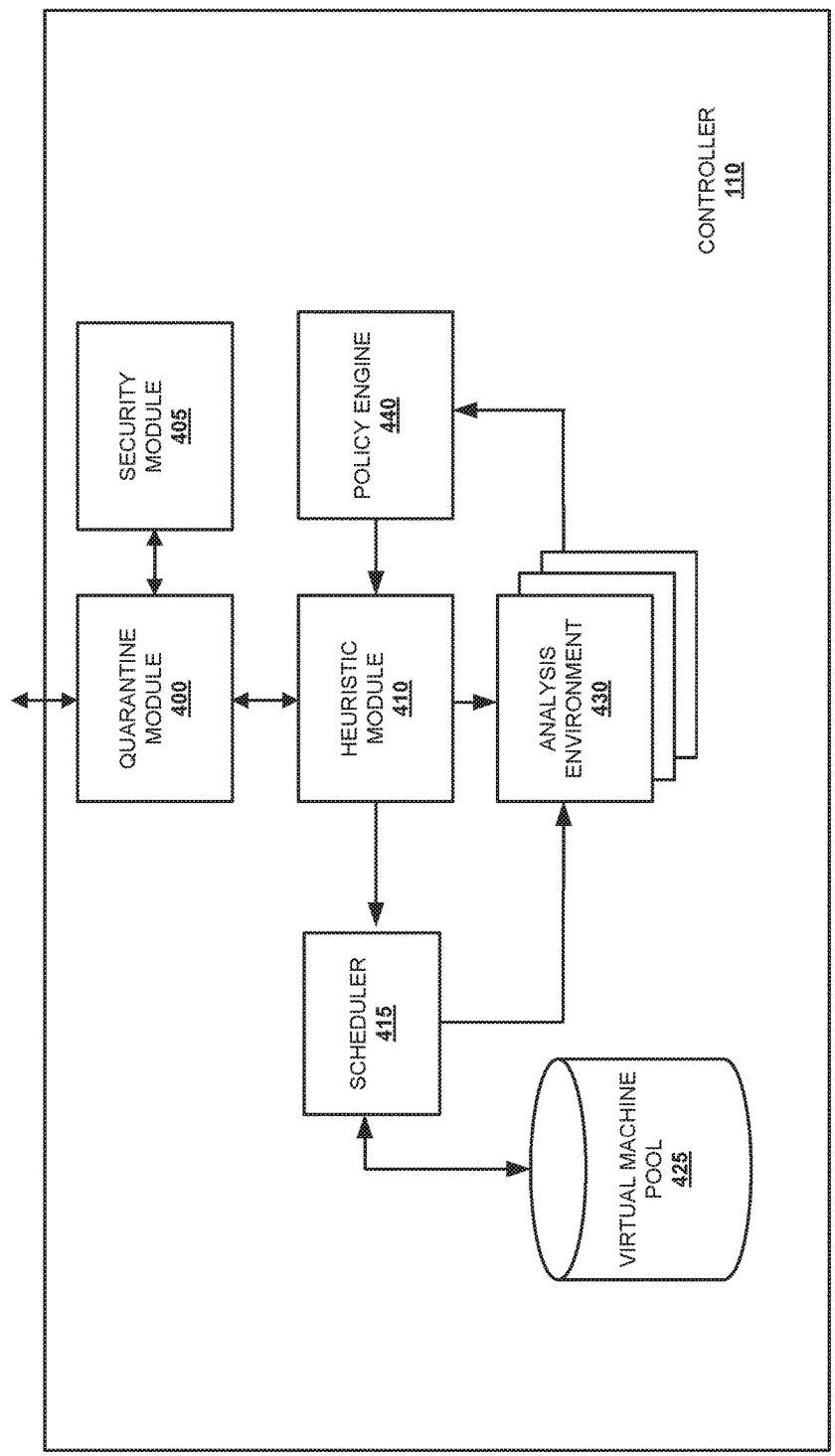
FIG. 4 is a block diagram of an exemplary controller implementing some embodiments of the present invention.

FIG. 4 is a block diagram of an exemplary controller 110. The controller 110 can be any digital device or software that receives data stored on the portable data storage devices 105 and/or the portable data storage device 205. The controller 110 may be used to implement the controller 210 of FIG. 2 or the controller 310 of FIG. 3.

The controller 110 can comprise a quarantine module 400, a security module 405, a heuristic module 410, a scheduler 415, a virtual machine pool 425, an analysis environment 430, and a policy engine 440. In some embodiments, the controller 110 may also comprise a tap or span port which is further coupled to the communication network 120. In other embodiments, the controller 110 may be coupled to an external tap or external span port of the security appliance 130 and/or the host device 230 and/or the client device 330.

The quarantine module 400 may detect the portable data storage devices 105 and/or the portable data storage device 205 as they couple to security appliance 130 and/or the host device 230. When the portable data storage device 205 is detected, the data transmitted from the portable data storage device 205 is redirected to the controller 110 for a predetermined time. The data redirected to the controller 110 is analyzed to determine if the data contains suspicious data (discussed below) or a malware attack. If the predetermined time expires and no suspicious data or malware is identified, then the quarantine module 400 ceases containment of the data from the portable data storage device 205.

The quarantine module 400 can detect the portable data storage device 205 by detecting a request for network services. When the portable data storage device 205 is connected to the host device 230, the host device 230 may be configured by the controller 110. In one example, the portable data storage device 205 may request an IP address. The IP address request, as well as the IP address assignment, may be detected by the quarantine module 400. Thereafter, all data from the IP address of the portable data storage device 205 may be quarantined for a predetermined period of time. Those skilled in the art will appreciate that there may be many ways to detect the portable data storage device 205 upon connection to the host device 230 and/or the communication network 120.

Similarly to the embodiments shown in FIG. 3, the quarantine module 400 may detect that the client device 330 intends or starts downloading data from the remote network server 320 over the communication network 120. The detection can be executed by analyzing data packets transmitted, requests for IP addresses, and so forth.

The quarantine module 400 can redirect data from the portable data storage device 205 or the remote network server 320. The data may then be transmitted from the portable data storage device 205 to the controller 110. If malware or suspicious data within the data is not detected by the controller 110, the indication to that effect may be provided to the host device 230. Similar technique may be used to redirect data from the remote network server 320.

Attempts may be made to access files on the portable storage device 205 before it has been determined that the portable storage device 205 does not include malware. The quarantine module 400 may intercept such access to files on the portable storage device 205, e.g., until the determination has been made.

In some embodiments, the controller 110 may quarantine data transmittable from the remote network server 320. More specifically, when the client device 330 is connected to the network server 320 over the communication network 120 and requests an IP address from a DHCP server, the quarantine module 400 may respond to the DHCP services request by configuring the client device 330 to transmit data to the controller 110. In one example, the quarantine module 400 may configure the client device 330 with a gateway IP address which is the same as the controller's 110 IP address as to send all data to the controller 110. If, after a predetermined period of time, no suspicious data or malware is detected, the client device 330 can be reconfigured so that the data is no longer transmitted to the controller 110.

The quarantine module 400 may also monitor the data directly or receive a copy of the data over a tap. In one example, the quarantine module 400 monitors and scans the data to detect the presence of the portable data storage device 205. When the portable data storage device 205 is added to the communication network 120, the quarantine module 400 quarantines the data from the portable data storage device 205 for the predetermined time. In some other embodiments, the quarantine module 400 quarantines the data downloaded from or residing at the remote network server 230 for the predetermined period of time. In another example, a tap may scan data for the portable data storage device 205 and alert the quarantine module 400 when the portable data storage device 205 is discovered. The quarantine module 400 may redirect all data from the host device 230 to the controller 110 over a separate link (not depicted) to the communication network 120. In some embodiments, there is not a tap but rather a span port.

The security module 405 may be configured to transmit commands to one or more security program(s) on the secure appliance 130 and/or the host device 230 and/or the client device 330 and to analyze responses from the security program(s). The security program(s) may be resident on the secure appliance 130 and/or the host device 230 and/or the client device 330 and are configured to activate and control security functions.

Security functions may comprise updating the operating system, updating security applications, or updating security application files. The operating system controls the components of the secure appliance 130 and/or the host device 230 and/or the client device 330 and facilitates the operation of applications. Examples of operating systems include Windows XP, Linux, and MacOS. Security applications include those applications for which the primary function is security. Examples of security applications include anti-virus programs, firewalls, and anti-spyware applications. Security files are any files that support the security applications. Examples of security files include virus definitions or spyware updates.

The security program(s) may also generate a security profile of the portable data storage devices 105 and/or the portable data storage device 205 and/or of the remote network server 320. The security profile may comprise a list of updates or patches that the operating system needs or possesses. In one example, the security program comprises the Microsoft update Application Programming Interface (API) in the Microsoft Windows Operating system. The Microsoft update API can scan the portable data storage device 205 to compile a list of existing patches and updates. The list may then be compared to an update list at the Microsoft website to determine needed patches and updates.

In various embodiments, the security profile comprises a list of security applications on the secure appliance 130 and/or the host device 230 and/or the client device 330. The security profile may also indicate which security applications are missing or inactive. The security profile may also indicate the date the security files were created and whether new security files may be available. In one example, the security profile shows the date when the anti-virus virus definitions file was created. The anti-virus virus definitions file is a file that comprises data to identify viruses and worms. The anti-virus definitions file may also include executable code configured to eliminate one or more viruses or worms.

The security status can also indicate whether the security applications are active. In one example, the security status indicates if the security applications are currently active. The security status may also indicate if the programs are automatically activated when the digital device is first turned on.

In some embodiments, the security status indicates the configuration of the security applications. In one example, the security status indicates if the firewall application is configured to block the transmission of data from and/or to high risk programs. The security status may also indicate if the anti-virus application is configured to scan for viruses in e-mail as e-mail arrives. In some embodiments, the security status also indicates if other applications have appropriate security settings. In one example, the security status may show if an e-mail program will allow the delivery of executable programs attached to e-mail or whether a web browser allows active-x programs to run.

The heuristic module 410 can receive data from the quarantine module 400. The heuristic module 410 applies heuristics and/or probability analysis to determine if the data from the portable data storage devices 105 and/or the portable data storage device 205 and/or the remote network server 320 contains suspicious activity. In one example, the heuristic module 410 applies a heuristic which identifies suspicious data within the data. The heuristic module 410 may then flag the data as suspicious. The data can then be buffered and organized into a data flow. The data flow can be provided to the scheduler 415. In some embodiments, the data is provided directly to the scheduler 415 without buffering or organizing the data flow.

The heuristic module 410 can perform any heuristic and/or probability analysis. The heuristic module 410 may identify the suspicious characteristic of the data as a result of inspecting the data. Further details regarding exemplary heuristics and/or probability analysis are described in U.S. patent application Ser. No. 13/011,344 entitled "Systems and Methods for Detecting Malicious PDF Network Content" incorporated by reference herein in its entirety. For example, when a characteristic of the data packet, such as a sequence of characters or keyword, is identified that meets the conditions of a heuristic used, a suspicious characteristic or "feature" of the packet of data is identified. The identified features may be stored for reference and analysis. Keywords used by heuristics may be chosen by performing an approximate Bayesian probability analysis of all the keywords in an HTML specification using a corpus of malicious data and a corpus of non-malicious data. The approximate Bayesian probability analysis may be based on the principles of the Bayesian theorem and/or naïve Bayesian classification. For instance, a probability $P_m$ that the keyword appears in malicious data may be computed using the corpus of malicious data, while a probability $P_n$ that the keyword appears in non-malicious data may be computed using the corpus of non-malicious data. A given keyword may be determined to be a suspicious characteristic for being associated with malicious data if a score based on a computed ratio $P_m/P_n$ exceeds a threshold of suspicion. The threshold of suspicion may be a value greater than 1, 10, 30, 60, 100, or some other number indicating how much more likely the suspicious characteristic is to indicate malicious data than to indicate non-malicious data.

A score related to a probability that the suspicious identified characteristic indicates malicious data is determined. An approximate Bayesian probability analysis may be used to determine the score. In various embodiments, the approximate Bayesian probability analysis may be performed in real-time or using a look-up table based on a previously performed approximate Bayesian probability analysis.

For example, the approximate Bayesian probability analysis may be performed to determine a relative probability score that a particular feature is associated with the presence of malicious content in a data packet by comparing a corpus of malicious data and a corpus of regular, non-malicious data. A feature may include a characteristic of the data packet, such as a sequence of characters or keyword, that meets the conditions of a heuristic used. The feature may also include a characteristic involving more than one packet inspected in sequence or in parallel. An example of a feature may include the character sequence "eval(unescape(", which indicates a JavaScript "unescape" command nested within a JavaScript "eval" command argument. A probability $P_{f|m}$ that the feature is present in a data packet of malicious content is computed by analyzing the corpus of malicious content. A probability $P_{f|n}$ that the feature is present in a data packet of non-malicious content is computed by analyzing the corpus of non-malicious content. A malicious probability score is computed as the base two logarithm of a relative probability factor $P_{m|f}$ that the feature is associated with malicious content. The malicious probability score is computed by computing the ratio of the base two logarithm ($\log_2$) of the probability that the feature is present in a data packet of malicious content and the base two logarithm of the probability that the feature is present in a data packet of non-malicious content. The relative probability factor $P_{m|f}$ may be expressed as follows:

$$\log_2(P_{m|f}) = \log_2(P_{f|m})/\log_2(P_{f|n}) \quad \text{Equation 1}$$

The size of the result $\log_2(P_{m|f})$ (i.e., malicious probability score) may indicate the probability that the suspicious data includes malicious data. For example, a result of eleven may indicate that the feature is approximately two thousand times more likely to appear in malicious data than in non-malicious data. Likewise, a value of twelve may indicate that the feature is approximately four thousand times more likely to appear in malicious data. In some embodiments, the malicious corpus and/or the non-malicious corpus may be continuously updated in response to monitored network data traffic, and the malicious probability scores associated with the features may be continuously updated in response to the updates to the corpuses. In other embodiments, the corpuses may be created and used in advance to store pre-computed malicious probability scores in a look-up table for reference when features are identified. The features associated with significant probabilities of malicious data may change as the corpuses change.

Rather than analyzing all files of the remote network device 320, the heuristic analysis may include identifying the types of files and data to be analyzed and limiting the analysis to those types. In addition, the remote network device may be monitored to determine incremental files added to the remote network device 320 since the last analysis, and perform the analysis only on those incremental files.

Exemplary heuristics analysis is also discussed in more detail in U.S. patent application Ser. No. 13/011,344 entitled "Systems and Methods for Detecting Malicious PDF Network Content", U.S. patent application Ser. No. 13/350,645 entitled "Network-Based Binary File Extraction and Analysis for Malware Detection", and in U.S. patent application Ser. No. 12/263,971 entitled "Systems and Methods for Detecting Malicious Network Content," which all are incorporated by reference herein in their entirety.

The heuristic module 410 can retain data packets belonging to a particular data flow previously received (e.g., received from a tap) or data flow provided by the quarantine module 400. In one example, the heuristic module 410 receives data packets and stores the data packets within a buffer or other memory. Once the heuristic module 410 receives a predetermined number of data packets from a particular data flow, the heuristic module 410 performs the heuristics and/or probability analysis.

In some embodiments, the heuristic module 410 performs heuristic and/or probability analysis on a set of data packets belonging to a data flow and then stores the data packets within a buffer or other memory. The heuristic module 410 can then continue to receive new data packets belonging to the same data flow. Once a predetermined number of new data packets belonging to the same data flow are received, the heuristic and/or probability analysis can be performed upon the combination of buffered and new data packets to determine a likelihood of suspicious activity.

In some embodiments, an optional buffer receives the flagged data from the heuristic module 410. The buffer can buffer and organize the flagged data into one or more data flows before providing the one or more data flows to the scheduler 415. In various embodiments, the buffer can buffer data and stall before providing the data to the scheduler 415. In one example, the buffer stalls the data to allow other components of the controller 110 some time to complete functions or otherwise clear data congestion.

The scheduler 415 is a module configured to retrieve a virtual machine associated with the portable data storage devices 105 and/or the portable data storage device 205 and/or the remote network server 320. The virtual machine is software that is configured to mimic the performance of a device. The virtual machine can be retrieved from the virtual machine pool 425.

In some embodiments, the heuristic module 410 transmits the metadata identifying the portable data storage devices 105 and/or the portable data storage device 205 and/or the remote network server 320 to the scheduler 415. In other embodiments, the scheduler 415 receives one or more data packets of the data from the heuristic module 410 and analyzes the one or more data packets to identify the portable data storage devices 105 and/or the portable data storage device 205 and/or the remote network server 320. In yet other embodiments, the metadata can be received from the tap.

The scheduler 415 can retrieve and configure the virtual machine to mimic the pertinent performance characteristics of a user device (not shown). In one example, the scheduler 415 configures the characteristics of the virtual machine to mimic only those features of the user device that are affected by the data copied by the tap. The scheduler 415 can determine the features of the user device that are affected by the data by receiving and analyzing the data from the quarantine module 400. Such features of the user device can include opening ports that are to receive the data, selecting device drivers that are to respond to the data, and configuring any other devices coupled to or contained within the user device that can respond to the data. In other embodiments, the heuristic module 410 can determine the features of the user device that are affected by the data by receiving and analyzing the data from the tap. The heuristic module 410 can then transmit the features of the user device to the scheduler 415.

The virtual machine pool 425 may be configured to store virtual machines. The virtual machine pool 425 can be any storage capable of storing software. In one example, the virtual machine pool 425 stores a single virtual machine that can be configured by the scheduler 415 to mimic the performance of any user device on the communication network 120. The virtual machine pool 425 can store any number of distinct virtual machines that can be configured to simulate the performance of any user devices.

The analysis environment 430 is a module for analysis of the data that may simulate transmission of the data (e.g., data files) between the portable data storage devices 105 and/or the portable data storage device 205 and/or the remote network server 320 and a user device (such as the host device 230, the client device 330 or any other electronic device), variously running the data files with its associated application or running an executable file in order to analyze the effects upon the user device. The analysis environment 430 may identify the effects of malware or illegitimate computer users (e.g., hackers, computer crackers, or other computer users) by analyzing the simulation of the effects of the data upon the user device that is carried out on the virtual machine. There may be multiple analysis environments 430 in some embodiments.

As the analysis environment 430 analyzes the data, behavior of the virtual machine can be closely monitored for unauthorized activity. If the virtual machine crashes, performs illegal operations, performs abnormally, or allows access of data to an unauthorized computer user, the analysis environment 430 can react. In some embodiments, the analysis environment 430 performs a dynamic taint analysis to identify unauthorized activity (dynamic taint analysis is further described in FIG. 5.)

Once unauthorized activity is detected, the analysis environment 430 can generate the unauthorized activity signature configured to identify data containing unauthorized activity. Since the unauthorized activity signature does not necessarily require probabilistic analysis to detect unauthorized activity within data, unauthorized activity detection based on the unauthorized activity signature may be very fast and save computing time.

The policy engine 440 may be coupled to the heuristic module 410 and is a module that may identify data as suspicious based upon policies contained within the policy engine 440. In one example, a user device may be a computer designed to attract hackers and/or worms (e.g., a "honey pot"). The policy engine 440 may contain a policy to flag any data directed to the honey pot as suspicious since the honey pot should not be receiving any legitimate data. In another example, the policy engine 440 can contain a policy to flag data directed to any intended user device that contains highly sensitive or "mission critical" information.

The policy engine 440 can also dynamically apply a rule to copy all data related to data already flagged by the heuristic module 410. In one example, the heuristic module 410 may flag a single packet of data as suspicious. The policy engine 440 may then apply a rule to flag all data related to the single packet (e.g., data flows) as suspicious. In some embodiments, the policy engine 440 flags data related to suspicious data until the analysis environment 430 determines that the data flagged as suspicious is related to unauthorized activity.

The policy engine 440 may scan data to detect unauthorized activity based upon an unauthorized activity signature. In some embodiments, the policy engine 440 retrieves the unauthorized activity signature from a signature module (not shown). The data is then scanned for unauthorized activity based on the unauthorized activity signature.

The policy engine 440 can scan the header of a packet of data as well as the packet contents for unauthorized activity. In some embodiments, the policy engine 440 scans only the header of the packet for unauthorized activity based on the unauthorized activity signature. If unauthorized activity is found, then no further scanning may be performed. In other embodiments, the policy engine 440 scans the packet contents for unauthorized activity.

Advantageously, unauthorized activity may be found by scanning only the header of a packet, the contents of the packet, or both the header and the contents of the packet. As a result, unauthorized activity that might otherwise evade discovery can be detected. In one example, evidence of unauthorized activity may be located within the contents of the packet. By scanning only the contents of the packet, unauthorized activity may be detected.

Figure 5:
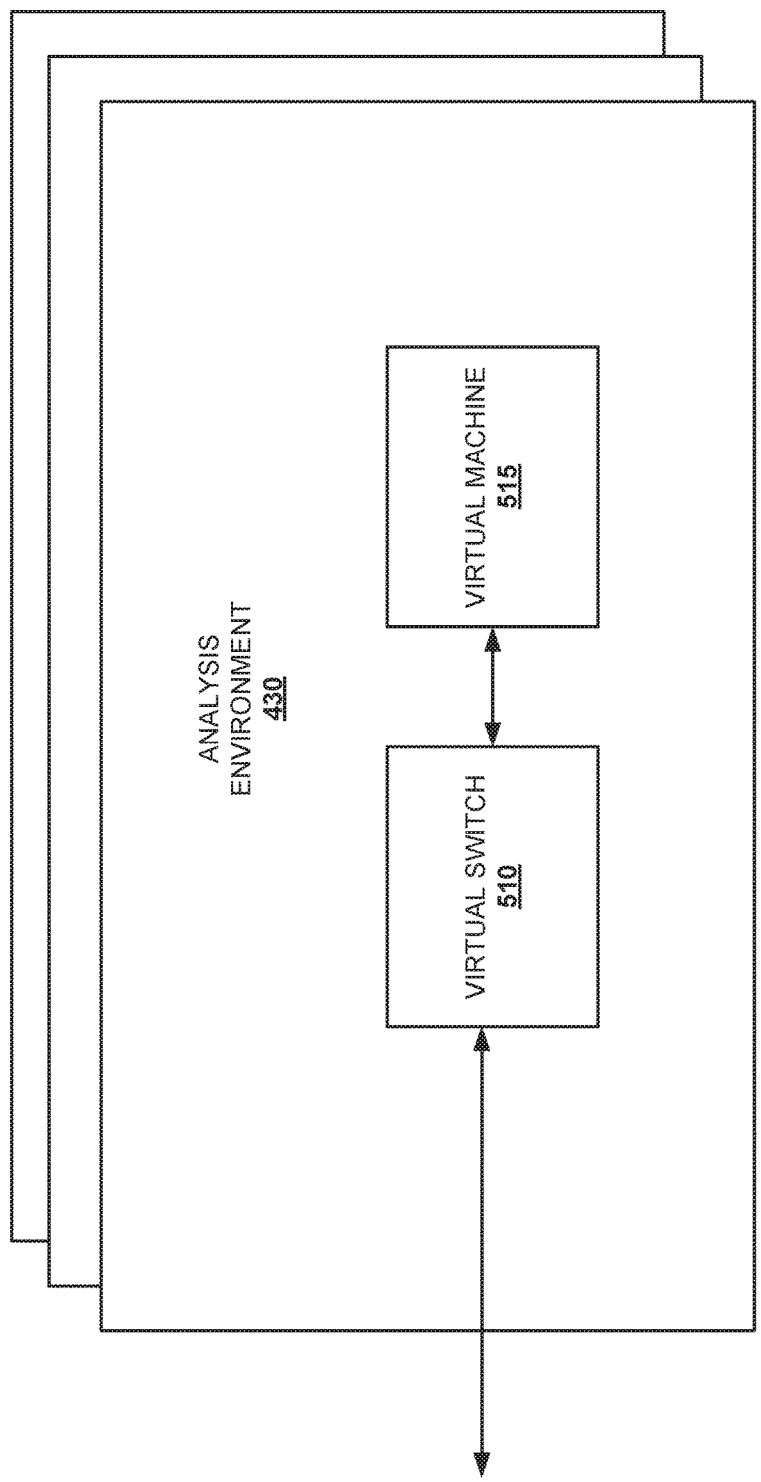
FIG. 5 is a block diagram of an exemplary analysis environment.

FIG. 5 depicts an analysis environment 430, in accordance with one embodiment of the present invention. The analysis environment 430 may comprise a virtual switch 510 and a virtual machine 515.

The virtual switch 510 may be software that is capable of forwarding packets of flagged data to the virtual machine 515. The virtual switch 510 simulates the communication network 120 and the virtual machine 515 simulates the user device. The virtual switch 510 can route the data packets of the data flow to the correct ports of the virtual machine 515.

The virtual machine 515 is a representation of the user device (such as, for example, the host device 230, the client device 330 or any other electronic device) that can be provided to the analysis environment 430 by the scheduler 415. In one example, the scheduler 415 retrieves a virtual machine 515 from the virtual machine pool 425 and configures the virtual machine 515 to mimic the user device. The configured virtual machine 515 is then provided to the analysis environment 430, where it can receive flagged data from the virtual switch 510.

As the analysis environment 430 simulates the transmission of the data, the behavior of the virtual machine 515 can be closely monitored for unauthorized activity. If the virtual machine 515 crashes, performs illegal operations, performs abnormally, or allows access of data to an unauthorized computer user, the analysis environment 430 can react.

In some embodiments, the analysis environment 430 performs dynamic taint analysis to identify unauthorized activity. For a malware attack to change the execution of an otherwise legitimate program, the malware attack may cause a value that is normally derived from a trusted source to be derived from the user's own input. Program values (e.g., jump addresses and format strings) are traditionally supplied by a trusted program and not from external untrusted inputs. Malware, however, may attempt to exploit the program by overwriting these values.

In one example of dynamic taint analysis, all input data from untrusted or otherwise unknown sources are flagged. Program execution of programs with flagged input data is then monitored to track how the flagged data propagates (i.e., what other data becomes tainted) and to check when the flagged data is used in dangerous ways. For example, use of tainted data as jump addresses or format strings often indicates an exploit of a vulnerability such as a buffer overrun or format string vulnerability.

In some embodiments, the analysis environment 430 monitors and analyzes the behavior of the virtual machine 515 in order to determine a specific type of malware or the presence of an illicit computer user. The analysis environment 430 can also generate computer code configured to eliminate new viruses, worms, or other malware. In various embodiments, the analysis environment 430 can generate computer code configured to identify data within the data indicative of a malware attack, repair damage performed by malware, or the illicit computer user. By simulating the transmission of suspicious data and analyzing the response of the virtual machine, the analysis environment 430 can identify known and previously unidentified malware and the activities of illicit computer users before a computer system is damaged or compromised.

Figure 6:
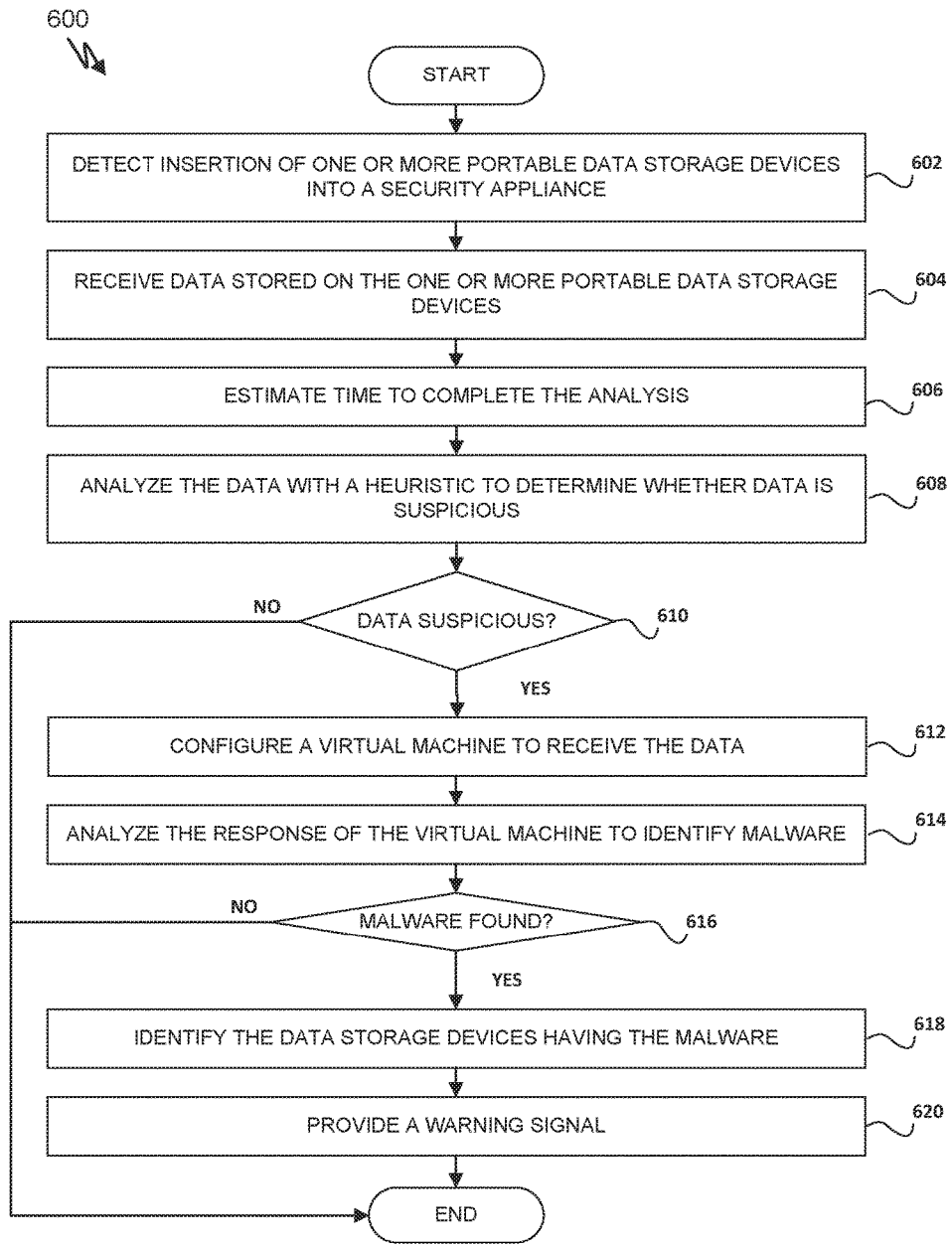
FIG. 6 is a flowchart of an exemplary method for detecting malicious network content on portable data storage devices upon insertion of the devices into a security appliance.

FIG. 6 is a flowchart of an exemplary method 600 for detecting malicious network content of portable data storage devices upon insertion of the devices into a security appliance. The method 600 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the controller 110, as illustrated in FIG. 1.

The method 600 may commence at step 602 with the controller 110 detecting an insertion of the one or more portable data storage devices 105 into the security appliance 130. In some exemplary embodiments, the security appliance 130 may detect insertion of the portable data storage devices and send, via a communication network, the data stored on the portable storage devices to the controller 110 for analysis. In one example, a user may bring a portable data storage device from home to work with an intention of using the portable storage device within the communication network 120. Security personnel may ask the user to insert the portable storage device into a slot configured to interface with the security appliance 130. This approach may allow screening portable storage devices such as USB flash drives upon inserting the devices into a security appliance. The security appliance may be associated with a security screening location such as a security checkpoint in a building. The security appliance may include a number of slots configured to receive a plurality of portable data storage devices simultaneously.

At step 604, the controller 110 may receive data stored on the one or more portable data storage devices 105 forwarded by the security appliance 130 over the communication network 120. Upon insertion of the portable data storage device 150 into the security appliance 130, the security appliance 130 may provide the owner of the portable data storage device 105 with an estimated time to complete the analysis as shown at step 606. The estimate is based on the current latency of the communication network.

At step 608, the controller 110 may analyze the data received from the security appliance 130 with a predetermined heuristics to determine whether the data is suspicious (i.e., includes certain suspicious traits). The latency of the communication network 120 may not allow the data to be analyzed with normal heuristics without exceeding the maximum time allotted for the analysis. Therefore, a faster heuristics analysis may be utilized depending on the latency of the communication network 120. The controller 110 may need to decide which heuristics to use to identify suspected malicious content and execute the content in virtual machines.

If it is determined at step 610 that the data is not suspicious, a report to this effect is generated and sent to the security appliance via the communication network 120. The portable data storage device may then be returned to the owner. However, in the situation of a reduced level of scrutiny, the clearance may be provisional. If a later analysis with normal heuristics indicates a problem, the owner of the portable data storage device may be located by the security personnel and appropriate measures may be taken. For example, the portable data storage device may be confiscated.

If, on the other hand, the heuristics analysis indicates a suspicious activity, the controller may execute the suspected data in a simulated real-life environment. Thus, if it is determined at step 610 that the data is suspicious, at step 612, the controller 110 may configure a virtual machine to receive and safely execute the suspected data in a simulated real-life environment. The method 600 continues to analyze the response of the virtual machine to identify malware at step 614. At step 616 it may be determined whether the data includes malware. If it is determined that the data does not include malware, a report to this effect may be generated and sent to the security appliance via the communication network 120. The portable data storage device may then be returned to the owner. If, on the other hand, it is determined at step 616 that the data includes malware, the method 600 may proceed to step 618 to identify the data storage devices 105 containing malware. If malware is found, at step 620, the security appliance 130 may provide a warning signal. For example, a pattern of beeps and/or flashes may indicate a security threat.

Figure 7:
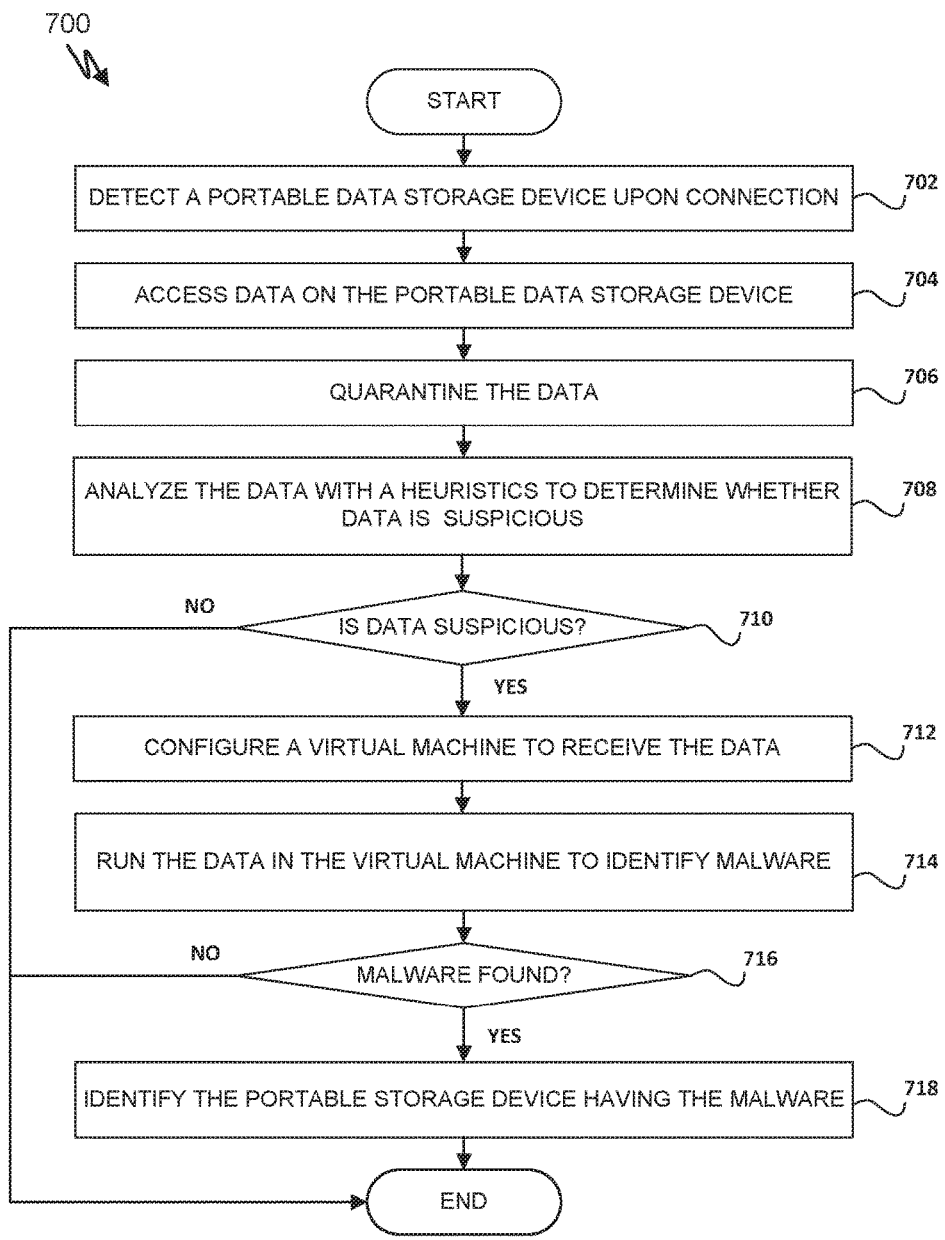
FIG. 7 is a flowchart of an exemplary method for detecting malicious network content on a portable data storage device upon connection to a host device.

FIG. 7 is a flowchart of an exemplary method 700 for detecting malicious network content of a portable data storage device connecting the device to a host device. The method 700 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the controller 210, as illustrated in FIG. 2.

The method 700 may allow detecting malicious content on a portable data storage device upon insertion of the device into a host device, such as a PC. The techniques utilized to determine whether the portable data storage device contains malware are similar to the ones described above. The exemplary method 700 may commence at step 702 with the controller detecting the portable data storage device 205 upon its connection to the host device 230. At step 704, the controller 210 may access data on the portable data storage device 205.

At step 706, the method 700 may continue with the controller 210 quarantining the data within the host device 230. For example, the controller 210 may prevent execution of any files stored on the portable data storage device 205.

The quarantining may also include ARP manipulations or configuring DHCP services to direct the data from the portable data storage device to the controller.

At step 708, the controller 210 may analyze the data received from the host device 230 with predetermined heuristics to determine whether the data is suspicious (i.e., includes certain suspicious traits). If it is determined, at step 710, that the data is not suspicious, a report to this effect may be generated and displayed by the host device 230. If, on the other hand, the heuristics analysis indicates a suspicious activity, the controller 210 may execute the suspected data in a simulated real-life environment. Thus, if it is determined at step 710 that the data is suspicious, at step 712, the controller 210 may configure a virtual machine to receive and safely execute the suspected data in a simulated real-life environment. The method 700 may analyze the response of the virtual machine and identify malware at step 714. At step 716, it may be determined whether the data includes malware. If it is determined that the data does not include malware, a report to this effect may be generated and displayed by the host device 230.

If, on the other hand, it is determined at step 716 that the data includes malware, the method 700 may proceed to step 718 to identify that the data storage device 205 contain malware.

Figure 8:
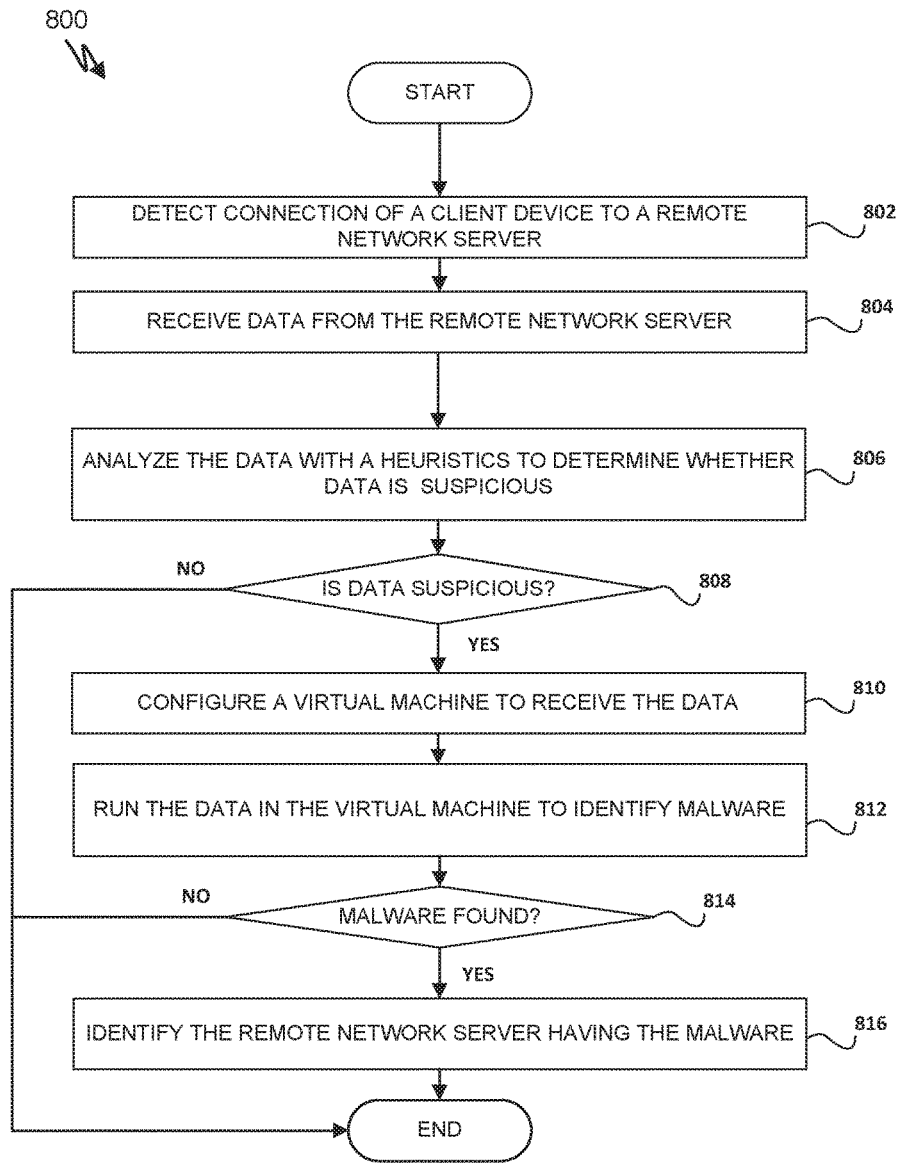
FIG. 8 is a flowchart of an exemplary method for detecting malicious network content of a remote network server when the server is connected to a client device over a communication network.

FIG. 8 is a flowchart of an exemplary method 800 for detecting malicious network content of a remote network server when the server is connected to a client device over a communication network. The method 800 may be performed by processing logic that may comprise hardware (e.g., dedicated logic, programmable logic, microcode, etc.), software (such as run on a general-purpose computer system or a dedicated machine), or a combination of both. In one exemplary embodiment, the processing logic resides at the controller 310, as illustrated in FIG. 3.

The method 800 may allow detecting malicious content on a remote network server upon establishment of connection of a client device, such as a PC, to the remote network server over a network such as the Internet or LAN. The techniques utilized to determine whether the remote network server contains malware are similar to the ones described above.

The exemplary method 800 may commence at step 802 with the controller 310 detecting connection of the client device 330 to the remote network server 320 over the communication network 120. Such connection may be detected, for example, when the client device 330 requests or confirms downloading some content from the remote network server 320. In some other embodiments, the connection can be detected by analyzing IP addresses of the client device 330.

At step 804, the controller 310 may redirect data flow from the client device 330 to the controller 310 thereby preventing downloading the content to the client device 330. At this step, the controller 310 receives the content of the remote network server 320.

At step 806, the controller 310 may analyze the data received from the remote network server 320 with predetermined heuristics to determine whether the data is suspicious (i.e., includes certain suspicious traits). If it is determined, at step 808, that the data is not suspicious, a report to this effect may be generated and displayed by the client device 330. If, on the other hand, the heuristics analysis indicates a suspicious activity, the controller 310 may execute the suspected data in a simulated real-life environment. Thus, if it is determined at step 808 that the data is suspicious, at step 810, the controller 310 may configure a virtual machine to receive and safely execute the suspected data in a simulated real-life environment. The method 800 may analyze the response of the virtual machine and identify malware at step 812. At step 814, it may be determined whether the data includes malware. If it is determined that the data does not include malware, a report to this effect may be generated and displayed by the client device 330. If, on the other hand, it is determined at step 814 that the data includes malware, the method 800 may proceed to step 816 to identify that the remote network server 320 contains malware. The data that includes malware may be located within one or more files in some embodiments and those one or more files may be moved to a pre-configured quarantine folder.

The malware found in regards to the remote network server may be associated with one or more callback channels for transmitting data back to the remote network server. For example, the malware may comprise a bot. A bot is a software robot configured to remotely control all or a portion of a digital device (e.g., a computer) without authorization by the digital device's user. Bot related activities include bot propagation and attacking other computers on a network. Bots commonly propagate by scanning nodes (e.g., computers or other digital devices) available on a network to search for a vulnerable target. When a vulnerable computer is scanned, the bot may install a copy of itself. Once installed, the new bot may continue to seek other computers on a network to infect. The bot may also, without the authority of the infected computer user, establish a command and control (C&C) communication channel, e.g. a callback channel, to receive instructions. For example, an IRC protocol may be used for bot command and control. Therefore, detecting the existence or establishment of an IRC channel in the network may indicate a possible botnet callback channel.

In some embodiments, the virtual machine is also configured to detect such callback channels. Information regarding the detected callback channels may be made stored or otherwise be made available to other elements of a malware detection system, e.g., to systems for detecting malware originating from the Internet, rather than just from the remote network server. Further details regarding exemplary callback (C&C) channel detection are described in U.S. patent application Ser. No. 11/998,750 entitled "Systems and Methods for Detecting Encrypted Bot Command & Control Communication Channels" and U.S. patent application Ser. No. 11/998,605 entitled "Systems and Methods for Detecting Communication Channels of Bots", both of which are incorporated by reference herein in their entirety.

Figure 9:
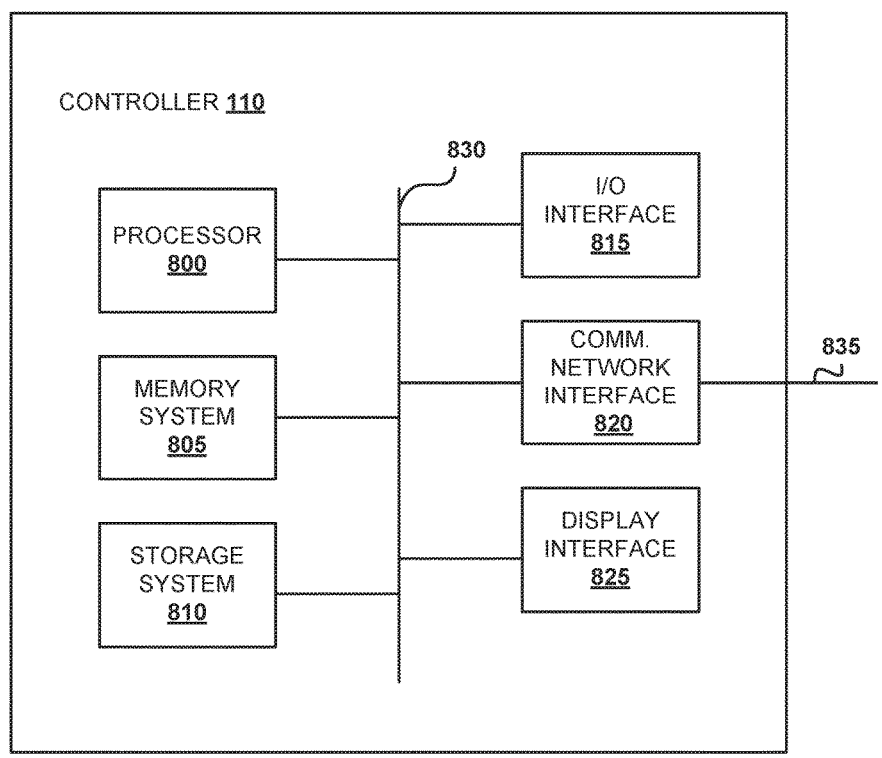
FIG. 9 is a block diagram of an exemplary controller, in accordance with an embodiment of the present invention.

FIG. 9 is a block diagram of the controller 110 (FIG. 1), in accordance with one embodiment of the present invention. The controller 110 may be used to implement the controller 210 of FIG. 2 or the controller 310 of FIG. 3. The controller 110 comprises a processor 900, a memory system 905, a storage system 810, an input/output (I/O) interface 915, a communication network interface 920, and a display interface 925, which are all coupled to a system bus 930. The processor 900 is configured to execute executable instructions. In some embodiments, the processor 900 comprises circuitry or any one or more processors capable of processing the executable instructions.

The memory system 905 is any memory configured to store data. Some examples of the memory system 905 include storage devices such as RAM or ROM.

The storage system 910 is any storage configured to retrieve and store data. Some examples of the storage system 910 are flash drives, hard drives, optical drives, and/or magnetic tape. The storage system 910 can comprise a database or other data structure configured to hold and organize data (e.g., data, copies of data, buffered data.) In some embodiments, the controller 110 includes memory 905 in the form of RAM and storage 910 in the form of flash data. The memory system 905 and/or the storage system 910 can comprise caches and buffers configured to retain data or copies of data.

The I/O interface 915 is any device that can receive input and provide output to a user. The I/O interface 915 can be, but is not limited to, a keyboard, a mouse, a touchscreen, a keypad, a biosensor, or floppy disk drive.

The communication network interface 920 can be coupled to any user device via the links 935. The communication network interface 920 may support communication over a USB connection, a firewire connection, an Ethernet connection, a serial connection, a parallel connection, or an ATA connection. The communication network interface 920 may also support wireless communication (e.g., 802.11 a/b/g/n or wireless USB). It will be apparent to those skilled in the art that the communication network interface 920 can support many wired and wireless standards.

The display interface 925 is an interface configured to support a display, monitor, or screen. In some embodiments, the controller 110 comprises a graphical user interface to be displayed to a user over a monitor in order to allow the user to control the controller 110.

The above-described modules can be comprised of instructions that are stored on storage media. The instructions can be retrieved and executed by a processor (e.g., the processor 900). Some examples of instructions include software, program code, and firmware. Some examples of storage media comprise memory devices and integrated circuits. The instructions are operational when executed by the processor to direct the processor to operate in accordance with embodiments of the present invention. Those skilled in the art are familiar with instructions, processor(s), and storage media.

The present invention is described above with reference to exemplary embodiments. It will be apparent to those skilled in the art that various modifications may be made and other embodiments can be used without departing from the broader scope of the present invention. Therefore, these and other variations upon the exemplary embodiments are intended to be covered by the present invention.

What is claimed is:

1. A method for detecting malicious content within a data storage device, the method comprising:
   quarantining data associated with a first digital device by at least (i) redirecting at least a portion of the data that is transmitted from the first digital device to a controller remotely located from the second digital device for analysis;
   receiving, by the controller, the redirected data from the first digital device;
   analyzing the redirected data in accordance with a first analysis to determine whether the first digital device is associated with a malicious attack, the first analysis being selected from a plurality of analyses, including the first analysis and a second analysis having a different depth of analysis than the first analysis, based on an estimated amount of time needed for an analysis of the redirected data without exceeding a predetermined time allotted for the analysis; and
   providing a warning signal based on a determination that the first digital device is associated with a malicious attack.

2. The method of claim 1, wherein the quarantining the data associated with the first device further comprises intercepting one or more requests from the first digital device.

3. The method of claim 1, wherein prior to quarantining the data associated with the first digital device, the method further comprising:
   detecting a communicative coupling of the first digital device to the second digital device.

4. The method of claim 1, wherein the first digital device comprises one or more portable storage devices including a Universal Serial Bus (USB) flash drive and the second digital device includes a USB interface.

5. The method of claim 1, wherein in response to determining the first digital device is associated with the malicious attack, providing the warning signal that causes emission of a pattern of audible sound.

6. The method of claim 1, wherein the second digital device comprises a security appliance that is positioned at a selected security screening location.

7. The method of claim 2, wherein the quarantining further comprises preventing processing of the data from the first digital device by the second digital device and at least one of the one or more requests includes a request for an internet protocol (IP) address.

8. The method of claim 1, wherein the first analysis being selected based on the estimated amount of time needed for the analysis of the redirected data where the estimated amount of time is based, at least in part, on a determined latency of a communication network coupling the controller to the first digital device.

9. The method of claim 1, wherein the analyzing of the redirected data comprises:
   configuring a virtual machine to receive the redirected data, wherein the virtual machine is configured with one of a plurality of different virtual machine configurations to simulate one or more performance characteristics of a destination device intended to receive the redirected data; and
   analyzing a response of the virtual machine to the redirected data to identify whether the first digital device is associated with the malicious attack.

10. The method of claim 1, wherein the analyzing of the redirected data comprises:
    analyzing the redirected data with the first analysis to identify data containing one or more suspicious characteristics, the first analysis being a first heuristic analysis of a plurality of different heuristic analyses;
    configuring a virtual machine to receive the data containing one or more suspicious characteristics; and
    analyzing a response of the virtual machine to identify the malware within the data containing one or more suspicious characteristics from the first digital device.

11. The method of claim 10, wherein the analyzing of the redirected data further comprises
    saving a copy of the redirected data and analyzing the copy of the redirected data in accordance with the first analysis, wherein the analyzing of the response of the virtual machine further comprises selectively identifying the one or more data storage devices as storing the malware.

12. A method for detecting malicious content within a data storage device, the method comprising:
    quarantining data associated with a first digital device by (i) redirecting at least a portion of the data, being transmitted from the first digital device to a second digital device, to a controller remotely located from the second digital device for analysis and (ii) intercepting one or more requests from the first digital device;

receiving, by the controller, the redirected data from the first device;

determining an estimated amount of time needed for an analysis of the redirected data;

selecting a first analysis from a plurality of analysis, including the first analysis and a second analysis being independent of the first analysis, based on the estimated amount of time;

analyzing the redirected data in accordance with the first analysis to determine whether the first digital device is associated with a malicious attack without exceeding a predetermined time allotted for the first analysis; and providing a warning signal based on a determination that the first digital device is associated with a malicious attack.

13. The method of claim 12, wherein the first digital device comprises one or more portable storage devices including a Universal Serial Bus (USB) flash drive and the second digital device includes a USB interface.

14. The method of claim 12, wherein in response to determining the first digital device stores malware, providing the warning signal that causes emission of a pattern of audible sound.

15. The method of claim 12, wherein the second digital device comprises a security appliance that is positioned at a selected security screening location.

16. The method of claim 12, wherein the quarantining further comprises preventing processing of the data from the first digital device by the second digital device and at least one of the one or more requests includes a request for an internet protocol (IP) address.

17. The method of claim 12, wherein the first analysis being selected based on the estimated amount of time needed for the analysis of the redirected data where the estimated amount of time is based, at least in part, on a determined latency of a communication network coupling the controller to the first digital device.

18. The method of claim 12, wherein the analyzing of the redirected data comprises:

configuring a virtual machine to receive the redirected data, wherein the virtual machine is configured with one of a plurality of different virtual machine configurations to simulate one or more performance characteristics of a destination device intended to receive the redirected data; and analyzing a response of the virtual machine to the redirected data to identify whether the first digital device is associated with the malware attack.

19. The method of claim 12, wherein the analyzing of the redirected data comprises:

analyzing the redirected data with the first analysis to identify data containing one or more suspicious characteristics, the first analysis being a first heuristic analysis of a plurality of different heuristic analyses;

configuring a virtual machine to receive the data containing one or more suspicious characteristics; and analyzing a response of the virtual machine to identify the malware within the data containing one or more suspicious characteristics from the first digital device.

20. The method of claim 19, wherein the analyzing of the redirected data further comprises saving a copy of the redirected data and analyzing the copy of the redirected data in accordance with the first analysis, wherein the analyzing of the response of the virtual machine further comprises selectively identifying the one or more data storage devices as storing the malware.

* * * * *